United States Patent [19]

Gras et al.

[11] Patent Number: 4,658,005
[45] Date of Patent: Apr. 14, 1987

[54] STORAGE-STABILE POLYURETHANE RESIN POWDER ENAMELS OR VARNISHES

[75] Inventors: Rainer Gras, Bochum; Heinz Riemer, Bottrop; Elmar Wolf, Recklinghausen, all of Fed. Rep. of Germany

[73] Assignee: Huls Aktiengesellschaft, Marl, Fed. Rep. of Germany

[21] Appl. No.: 764,011

[22] Filed: Aug. 9, 1985

[30] Foreign Application Priority Data

Sep. 22, 1984 [DE] Fed. Rep. of Germany ....... 3434881

[51] Int. Cl.$^4$ ............................................. C08G 18/80
[52] U.S. Cl. ...................................................... 528/45
[58] Field of Search ............................................ 528/45

[56] References Cited

U.S. PATENT DOCUMENTS

| | | | |
|---|---|---|---|
| 3,660,359 | 5/1972 | Labana | 528/45 |
| 3,676,405 | 7/1972 | Labana | 528/45 |
| 3,822,240 | 7/1974 | Schmitt et al. | 528/45 |
| 4,246,380 | 1/1981 | Gras et al. | 528/45 |
| 4,252,923 | 2/1981 | König et al. | 525/452 |
| 4,255,551 | 3/1981 | Wolf et al. | 528/45 |
| 4,369,301 | 1/1983 | Konig et al. | 528/61 |
| 4,495,229 | 1/1985 | Wolf et al. | 528/45 |

FOREIGN PATENT DOCUMENTS 1265634  3/1972  United Kingdom .
1465286  2/1977  United Kingdom .

*Primary Examiner*—Maurice J. Welsh
*Attorney, Agent, or Firm*—Oblon, Fisher, Spivak, McClelland & Maier

[57] ABSTRACT

A storage-stabile polyurethane resin powder enamel which cures below 170° C., which comprises a polyol in combination with isophorone diisocyanate (IPDI) which is blocked with a secondary amine having a boiling point of at least 150° C. and which has the general formula:

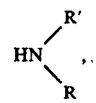

wherein R and R' are identical or different substituted alkyl groups with substitution in the position alpha to the nitrogen and wherein R and R' together must contain at least 9 carbon atoms, and R and R' together may form a common ring with at least 3 carbon atoms with the carbon atoms optionally interrupted by or substituted by nitrogen and/or oxygen hetero atoms.

6 Claims, No Drawings

STORAGE-STABILE POLYURETHANE RESIN POWDER ENAMELS OR VARNISHES

BACKGROUND OF THE INVENTION

1. Field of the Invention

The present invention relates to polyurethane resin powder enamels.

2. Description of the Background

In about 1970, an intense period of activity began for the development of a new "generation" of powders. These powders are the polyurethane (hereinafter "PUR") powders which are based on ε-caprolactam-blocked isophorone diisocyanate/polyol adducts and polyester polyols, as described, for instance, in, e.g., German OS No. 19 57 483 and Ger. Pat. No. 2,127,839. ε-Caprolactam-blocked isophorone diisocyanate (IPDI) melts at 53°-55° C. Because the blocked IPDI has such a low melting temperature, powders produced from this blocked IPDI agglomerate or cake during storage. In order to raise its melting point, IPDI has been subjected to chain lengthening with a polyol (NCO:OH=2:1) before being blocked with the ε-caprolactam-blocking agent. Polyols such as 3-hydroxymethyl-1,5-pentanediol, 2,2,4-trimethyl-1,6-hexanediol, and diethylene glycol are mentioned in German Pat. No. 2,105,777 as chain lengthening agents for IPDI, and German OS No. 25 42 191 refers to mixtures of di- and trifunctional polyols as chain lengthening agents for IPDI.

The enamel or varnish (hereinafter the term "enamel", will only be used but includes varnishes within its scope) coatings produced with heat by these ε-caprolactam-blocked IPDI/polyol adducts are distinguished by good flow properties, good chemical resistance, and other good properties (beside flow properties) relating to coating technology. A crucial disadvantage of such PUR powder enamels however, is their high curing temperature of about 200° C.

There has been no lack of attempts to reduce the high curing temperatures of PUR powder. German OS No. 30 04 876 describes the preparation of blocked IPDI adducts which have greater reactivity than the PUR powder hardeners described in German Pat. No. 2,105,777, said preparation being by means of reaction with a polyol such that 8 equivalents of NCO in the IPDI reactant react per OH equivalent in the polyol, following which reaction the free NCO groups are blocked.

German OS Nos. 27 35 497 and 28 42 641 describe more reactive PUR powders which are characterized by having as a hardener an ε-caprolactam-blocked isocyanate-group containing IPDI adduct. The curing temperature of the PUR powders described in these patent-related publications is at least 170° C.

A further reduction of the curing temperature of PUR powders has been found to be achievable by employing IPDI as a hardener and IPDI/polyol adducts (NCO:OH=2:1) having cyclic-amidine-blocked NCO groups (German OS No. 27 44 721). However, the cured powder enamel films have a pronounced yellow color.

There is currently a great demand for PUR powder hardeners from which weatherable, non-colored powder coatings can be produced at temperatures below 170° C.

German OS No. 32 31 558 shows that it is known to employ secondary amines as blocking agents for isocyanates, in particular in the industrial area of solvent-containing varnishes, and the like. The use of amines for this purpose is attended by the problem that some amine always remains in the coating and leads to coloration (see German OS No. 32 31 558, p. 8 line 34, and German OS No. 30 39 824, p. 6 line 19).

Thus it is surprising that amines as blocking agents have proven suitable for use in the solvent-containing varnish sector. This suitability may be explained by the fact that the amines are nearly completely removed with the solvent.

A need therefore continues to exist for a blocked isophorone diisocyanate of improved properties.

SUMMARY OF THE INVENTION

Accordingly, one object of the present invention is to provide a powder enamel of improved properties, especially a lower curing temperature.

Another object of the present invention is to provide a blocked isophorone diisocyanate which is distinguished by good flow properties, and good chemical resistance.

Briefly, these objects and other objects of the present invention as hereinafter will become more readily apparent can be attained by a polyurethane resin powder enamel comprising a polyol and isophorone diisocyanate blocked with a secondary amine having a boiling point of at least 150° C. and having the formula:

wherein R and $R_1$ are as defined hereinafter.

DESCRIPTION OF THE PREFERRED EMBODIMENTS

In the research leading to the present invention, it was surprising to find that, with certain exceptions, it is possible to employ secondary amines in powder enamels without coloration developing during baking, overbaking, or weathering. One skilled in the art could not have foreseen this, because it is known that relatively large amounts of the blocking agent remain in the cured powder enamel, which fact would definitely be expected to lead to unusable products because of coloring by the amine(s) during baking. Among the amines believed to be unsuitable is, e.g., diisopropylamine, which when used in powder enamels leads to pronounced foaming as a result of its high volatility. Using this particular amine is a simple way to produce PUR powder hardeners based on IPDI, while avoiding a chain lengthening step. Such powder hardeners have the advantageous properties of the hardeners described initially supra and additionally are more reactive.

Thus, the discovery of the present invention is storage-stable PUR resin powder enamels which cure below 170° C. which are comprised of polyols and blocked IPDI. The enamels are formed by the reaction of IPDI with secondary amines having a boiling point of at least 150° C. and having the general formula:

where R and R' are identical or different substituted alkyl groups with substitution in the position alpha to the nitrogen, which groups may be substituted cycloalkyl groups, or arylalkyl groups, wherewith R and R' together must contain at least 9 carbon atoms, and R and R' together may form a common ring with at least 3 carbon atoms, with the carbon atoms possibly interrupted by or substituted by nitrogen and/or oxygen hetero atoms.

IPDI and the secondary, sterically hindered amines are used in amounts of 0.5–1 mol, preferably 0.8–1 mol of secondary amine per equivalent of NCO.

For the reasons mentioned it is not surprising that among the multiplicity of blocking agents which have active N-, O-, or C-hydrogen atoms, primary or secondary amines are not mentioned in the literature as blocking agents for polyisocyanates in powder enamels. It is true that there are a number of patent documents in which ureas prepared from mono- and diisocyanates along with primary or secondary amines are described as hardeners for epoxy resins; see, e.g., U.S. Pat. Nos. 3,227,679, 3,317,612, 3,321,549, 3,789,071, 3,417,175, and 3,956,237. Here, however, the curing proceeds essentially by reaction of the urea group with the epoxide group to form an oxazolidinone. There is no reference or hint in the literature as to the use of substituted ureas prepared from polyisocyanates and secondary amines as powder hardeners for polyols. Moreover, it should be mentioned that for preparing the present compounds, only secondary amines which are sterically hindered and boil at at least 150° C. are suitable. An IPDI blocked with diisopropylamine, e.g., is deblocked at a lower temperature than an ε-caprolactam-blocked IPDI. Nonetheless, such a product is unsuitable as a PUR powder hardener, because the amine liberated in the curing is readily volatilized and leads to foaming in the enamel film.

The more sterically hindered the secondary amine (or stated more precisely, the greater the steric screening of the hydrogen atom attached to the nitrogen atom) the lower the breakdown temperature of the polyisocyanate blocked with said amine.

As a rule, in preparing the inventive PUR powder hardeners, the IPDI not previously subjected to molecular augmentation e.g., chain lengthening, is reacted with the sterically hindered secondary amines directly or in solution. It may be very advantageous in special cases to subject the IPDI to a preliminary reaction for molecular augmentation before the blocking reaction. Such a reaction would be with one or more of the usual so-called chain-lengthening agents employed in isocyanate chemistry (see, e.g., German Pat. Nos. 19 57 483, 25 42 191, and 30 04 876 and German Pat. No. 2,105,777 for chain lengthening with polyols, and see German OS Nos. 27 35 497 and 28 42 641 for molecular augmentation of IPDI by partial trimerization).

Suitable secondary amines for use in the present invention include t-butyl-1-methylpentylamine, t-butylbenzylamine, di-(1-methylpentyl)amine, di-(1-ethylbutyl)amine, dicyclohexylamine, t-butylcyclohexylamine, di-(3,5,5-trimethylcyclohexyl)amine, dicyclopentylamine, 2,6-dimethylpiperidine, 3,5-dimethylmorpholine, and the like. Mixtures of suitable secondary amines may also be employed according to the invention.

The reaction of the IPDI with the secondary amines may be carried out either in solvents or in the molten state. When carried out directly without solvent, the IPDI is heated to 70°–120° C. and the secondary amine is added (dosed) to it in such a way that the temperature of the reaction mixture does not exceed 130° C. After the blocking agent has all been added, heating of the reaction mixture is continued at about 100°–120° C. for about 1 hr to allow the reaction to go to completion.

As mentioned, the blocking reaction may be carried out in solvent solution. Candidate solvents, of course, only include those which do note react with IPDI, e.g., ketones such as acetone, methyl-ethylketone, methyl isobutyl ketone, cyclopentanone, cyclohexanone, and the like; aromatic compounds such as toluene, nitrobenzene, and the like; cyclic ethers such as tetrahydrofuran and dioxane; and aprotic solvents such as dimethylformamide, dimethylacetamide, dimethylsulfoxide, and the like.

The thus obtained compounds generally have a molecular weight ranging from 300–900, preferably 350–700. The products of the preparation process have a melting range of 70°–180° C., preferably 80°–140° C. The IPDI blocked with the secondary amines is characterized by having from 8–20 wt %, preferably 10–16 wt % of its NCO groups blocked with the amine blocking agent.

The products of said process are particularly suitable as hardeners for multifunctional compounds which contain Zerewitinoff active hydrogens. In combination with such Zerewitinoff-active-hydrogen-containing compounds, the said products form systems which cure to highly valuable plastics at temperatures above 110° C., preferably 130°–170° C. The most significant area of application for the inventive compounds is as binders for light-resistant PUR powder enamels.

The heat-curable powder compositions in which the present blocked polyisocyanate is employed has the following formulation:
 (a) 100 parts by wt. hydroxyl-group-containing polymer.
 (b) 10–90 parts by wt. blocked IPDI.
 (c) 0–120 parts by wt. pigments.
 (d) 0–200 parts by wt. customary fillers.
 (e) 0–5 parts by wt. catalyst.
 (f) 0–5 parts by wt. vehicle.

In principle, component (a) may be any polymer containing more than 2 OH groups which melts at at least 70° C., e.g. a polyetherpolyol, a polyester amide polyol, a polyurethanepolyol, a hydroxylated acrylic resin, or the like, wherewith the OH groups of said polymer are present so as to be able to react with the present blocked IPDI. Among the many possibilities for hydroxyl-group-containing polymers useful in connection with the invention, particularly preferred are the polyesterpolyols. Such polyesterpolyols must have a molecular weight between 1,000 and 10,000, preferably 1,500–5,000, and must have an OH number of 20–240, preferably 30–100. Qualifying polyesterpolyols are described, e.g., in German OS Nos. 19 57 483, 25 42 191, 30 04 876, and 31 43 060.

In order to increase the gelification rate of the heat-curable compositions, catalysts may be added. Suitable catalysts include organotin compounds such as dibutyltin dilaurate, Sn(II) octanoate, dibutyltin maleate, and the like.

The amount of catalyst added is 0.1–5 wt. % based on the weight of the hydroxyl-group-containing polymer. The prepared coatings of the present invention are distinguished by outstanding weatherability and very good color stability.

Having generally described this invention, a further understanding can be obtained by reference to certain specific examples which are provided herein for purpose of illustration only and are not intended to be limiting unless otherwise specified.

A. PREPARATION OF THE BLOCKED POLYISOCYANATES:

EXAMPLE 1

At 120° C., 724 parts by wt. dicyclohexylamine was added dropwise to 444 parts by wt. IPDI, all the while taking care that the temperature of the reaction mixture did not exceed 130° C. After completion of the addition of the ingredients, the reaction mixture was heated at 130° C. for an additional c. 1 hr to allow the reaction to go to completion.

The resulting product had a melting point of 105°–110° C. and a 14.3% content of blocked NCO.

EXAMPLE 2

At 130° C., 530 parts by wt. di-(3,5,5-trimethylcyclohexyl)amine was added dropwise to 222 parts by wt. IPDI, over a period of c. 2 hr. After completion of the amine addition, the reaction mixture was heated at 130° C. for an additional 2 hr. The resulting reaction mixture had a melting point of 84°–91° C. and an 11.1% content of blocked NCO groups.

EXAMPLE 3

Analogously to the method described in Examples 1 and 2, 226 parts by wt. 2,6-dimethylpiperidine was reacted with 222 parts by wt. IPDI. The reaction product had a melting point of 99°–103° C. and an 18.7% content of blocked NCO groups.

EXAMPLE 4

(Comparison Example)

At room temperature, 101 parts by wt. diisopropylamine was added dropwise to 111 parts by wt. IPDI which had been dissolved in 500 parts by wt. anhydrous acetone, said addition being over a period of c. 2 hr. After this addition, the reaction mixture was heated at 50° C. for an additional 2 hr. Then the acetone was distilled off, and the residual acetone was expelled in a vacuum drying cabinet at 60° C. and 1 Torr. The reaction product had a melting point 65°–74° C. and a 19.8% content of blocked NCO groups.

EXAMPLE 5

(Comparison Example)

Analogously to the method described in Example 4, 129 parts by wt. diisobutylamine was reacted with 111 parts by wt. IPDI. The reaction product had a melting point of 73°–77° C. and a 17.5% content of blocked NCO groups.

EXAMPLE 6

(Comparison Example)

At 110° C., 400 parts by wt. N-methylpiperazine was added dropwise to 444 parts by wt. IPDI, taking care that the temperature of the reaction mixture did not exceed 135° C. After completion of the amine addition, the reaction mixture was heated at 130° C. for an additional 1 hr to allow the reaction to go to completion. The reaction product had a melting point of 73°–77° C. and an 18.7% content of blocked NCO groups.

In all of Examples 1–6, free amine could not be detected in the reaction product.

B. POLYOL COMPONENT

General Method of Preparation

The starting components—terephthalic acid ("Ts"), dimethyl terephthalate ("DMT"), 1,6-hexanediol ("HD"), 2,2-dimethyl-1,3-propanediol ("NPG"), 1,4-dimethylolcyclohexane ("DMC") and trimethylolpropane ("TMP")—are changed into a reactor and heated with an oil bath. After most of the material melts, 0.05 wt. % of di-n-butyltin oxide is added at 160° C. as a catalyst. The first methanol abstraction occurs at about 170° C. The temperature is increased to 220°–230° C. within 6 to 8 hr, and during an additional 12 to 15 hr the reaction continues to completion. The polyester is cooled to 200° C. and the volatile components are substantially removed by application of a vacuum (1 Torr) within 30–45 min. During the entire reaction time the bottom product is stirred, and a stream of nitrogen at a low flow rate is passed through the reaction mixture.

The following Table gives the compositions of two polyesters, along with corresponding physical and chemical data.

TABLE OF POLYESTERS

| | Starting Components | | | | | | Chemical and Physical Data | | | | |
|---|---|---|---|---|---|---|---|---|---|---|---|
| Example | Ts Mol | DMT Mol | HD Mol | NPG Mol | DMC Mol | TMP Mol | OH-number mg KOH/g | Acid No. mg KOH/g | Melting Point °C. | DTA °C. | Viscosity at 160° C. mPa · s |
| 1 | 10 | 10 | 6.25 | 10.5 | 2 | 2.9 | 55–60 | 3–4 | ca. 75 | ca. 50 | ~25,000 |
| 2 | Crylcoat ® 280 M; a polyester manufactured by UCB | | | | | | ~50 | <10 | 100 ± 8 | 55 ± 8 | — |

C. POLYURETHANE POWDER ENAMELS

General Compounding Method:

The ground products, crosslinking agents, polyester and master batch vehicle are intermixed in an edge mill, along with the white pigment and fillers, if any (white pigment or filler), and are then homogenized in an extruder at 80°–110° C. After cooling, the extrudate is broken up and comminuted with a pinned disc mill to a particle size of <100 micron. The powder thus produced is applied with an electrostatic powder spray applicator at 60 kV to a degreased, possibly pretreated steel plate, and is baked in an air circulation drying cabinet.

Vehicle master batch: The vehicle—a commercially widely available copolymer of butyl acrylate and 2-ethylhexyl acrylate—is homogenized in the amount of 10 wt. % into the polyester in the melt. After hardening, the mass is comminuted.

Pigmented Powder Enamel—Example No. 1

A powder enamel with the following formulation was produced, applied, and baked between 160° and 200° C. according to the details described in the general method above:

489.4 parts by wt. of the polyester of Example B 1;
170.6 parts by wt. of the crosslinking agent of Example A 1;
480.0 parts by wt. white pigment (TiO₂)'; and
60.0 parts by wt. master batch vehicle.

Table of Baking Conditions and Physical Properties:

| Baking Conditions Time/Temperature | Mechanical Data | | | | | | |
|---|---|---|---|---|---|---|---|
| | SD | HK | HB | ET | GS | Imp. Rev. | GG 60° |
| 6'/200° C. | 70–85 | 181 | 100 | 5.4–6.8 | 0 | 576 | 82 |
| 8'/200° C. | 60–80 | 177 | 100 | 8.8–10.0 | 0 | 691.2 | 85 |
| 10'/200° C. | 70–80 | 175 | 100 | 9.5–10.0 | 0 | 944.6 | 82 |
| 10'/180° C. | 60–70 | 177 | 100 | 7.2–8.8 | 0 | 691.2 | 79 |
| 12'/180° C. | 70 | 180 | 100 | 9.0–10.0 | 0 | 944.6 | 78 |
| 15'/180° C. | 60–75 | 179 | 100 | >10.0 | 0 | 944.6 | 82 |
| 15'/170° C. | 70 | 179 | 111 | 8.2 | 0 | 460.8 | 78 |
| 20'/170° C. | 70 | 183 | 111 | 9.2–10.0 | 0 | 806.4 | 80 |
| 20'/160° C. | 70–90 | 186 | 111 | 6.1–8.9 | 0 | 806.4 | 78 |
| 25'/160° C. | 70–85 | 184 | 100 | 9.2–10.0 | 0 | 806.4 | 79 |

SD = Layer thickness (microns)
HK = König Hardness (sec) (DIN 53 153)
HB = Buchholz hardness (DIN 53 153)
ET = Erichsen penetration (mm) (DIN 53 156)
GS = Grid-cut test (DIN 53 151)
Imp rev. = Impact reverse (g·m);
GG 60° C. = Gardner gloss measurement (ASTM-D 523).

Pigmented Powder Enamel—Example No. 2

A powder enamel with the following formulation was produced, applied, and baked between 160° and 200° C., according to the above described general method:

453.8 parts by wt. of the polyester of Example B 1;
206.2 parts by wt. of the crosslinking agent of Example A 2;
480.0 parts by wt. white pigment (TiO₂); and
60.0 parts by wt. master batch vehicle.

Table of Baking Conditions and Physical Properties:

| Baking Conditions Time/Temperature | Mechanical Data | | | | | | |
|---|---|---|---|---|---|---|---|
| | SD | HK | HB | ET | GS | Imp. Rev. | GG 60° |
| 6'/200° C. | 60–70 | 183 | 100 | 9.5–9.7 | 0 | 806.4 | 79 |
| 8'/200° C. | 50–70 | 178 | 111 | 9.8–10.0 | 0 | >944.6 | 81 |
| 10'/200° C. | 60–70 | 176 | 125 | 9.4–9.9 | 0 | >944.6 | 83 |
| 10'/180° C. | 50–60 | 186 | 125 | 9.0–9.3 | 0 | 806.4 | 79 |
| 12'/180° C. | 60–70 | 181 | 100 | 9.4–10.0 | 0 | 806.4 | 78 |
| 15'/180° C. | 55–65 | 178 | 100 | >10.0 | 0 | 944.6 | 80 |
| 20'/170° C. | 60–70 | 182 | 111 | 9.7–10.0 | 0 | 410.8 | 78 |
| 25'/170° C. | 60–70 | 187 | 111 | 9.4–10.0 | 0 | 806.4 | 82 |
| 25'/160° C. | 60–70 | 187 | 111 | 9.5–10.0 | 0 | 806.4 | 81 |
| 30'/160° C. | 50–60 | 182 | 100 | 9.3–10.0 | 0 | 944.6 | 80 |

KEY to table: (same as for the preceding Example).

Pigmented Powder Enamel—Example No. 3

A powder enamel with the following formulation was produced, applied, and baked between 160° and 200° C., according to the above described general method:

420.2 parts by wt. of the polyester of Example B 2;
129.8 parts by wt. of the crosslinking agent of Example A 1;
400.0 parts by wt. white pigment (TiO₂); and
50.0 parts by wt. master batch vehicle.

Table of Baking Conditions and Physical Properties:

| Baking Conditions Time/Temperature | Mechanical Data | | | | | | |
|---|---|---|---|---|---|---|---|
| | SD | HK | HB | ET | GS | Imp. Rev. | GG 60° |
| 8'/200° C. | 50–60 | 170 | 100 | 6.4–6.6 | 0 | 691.2 | 72 |
| 10'/200° C. | 60–70 | 165 | 100 | 8.3 | 0 | 691.2 | 74 |
| 12'/200° C. | 60–70 | 172 | 100 | 9.0–9.3 | 0 | 806.4 | 74 |
| 12'/180° C. | 60–70 | 170 | 100 | 4.9–5.1 | 0 | 115.2 | 76 |
| 15'/180° C. | 55–75 | 172 | 111 | 6.7–8.5 | 0 | 345.6 | 74 |
| 20'/180° C. | 60–80 | 167 | 100 | 8.4–9.0 | 0 | 691.2 | 75 |
| 15'/170° C. | 50–60 | 170 | 100 | 7.1–8.6 | 0 | 806.4 | 77 |
| 20'/170° C. | 60 | 174 | 111 | 7.9–8.8 | 0 | 691.2 | 77 |
| 20'/160° C. | 50–60 | 169 | 100 | 8.1–8.8 | 0 | 576 | 72 |
| 25'/160° C. | 55–70 | 174 | 100 | 7.9–9.0 | 0 | 691.2 | 74 |

KEY to Table (same as for the preceding Example).

Pigmented Powder Enamel—Example No. 4

A powder enamel with the following formulation was produced, applied, and baked between 160° and 200° C., according to the above described general method:

392.2 parts by wt. of the polyester of Example B 2;
157.8 parts by wt. of the crosslinking agent of Example A 2;
400.0 parts by wt. white pigment (TiO₂); and 50.0 parts by wt. master batch vehicle.

Table of Baking Conditions and Physical Properties:

| Baking Conditions Time/Temperature | Mechanical Data | | | | | | |
|---|---|---|---|---|---|---|---|
| | SD | HK | HB | ET | GS | Imp. Rev. | GG 60° |
| 8'/200° C. | 50–60 | 175 | 100 | 7.5–8.0 | 0 | 460.8 | 81 |
| 10'/200° C. | 60–70 | 173 | 111 | 9.0–9.3 | 0 | 691.2 | 81 |
| 12'/200° C. | 50–70 | 175 | 100 | 9.5–10.0 | 0 | 944.6 | 84 |
| 12'/180° C. | 60–70 | 180 | 100 | 7.4–8.0 | 0 | 345.6 | 86 |
| 15'/180° C. | 70 | 177 | 111 | 8.5–9.0 | 0 | 576 | 82 |
| 20'/180° C. | 60–70 | 178 | 111 | 9.0–10.0 | 0 | 806.4 | 84 |
| 20'/170° C. | 50 | 182 | 100 | 6.1–7.0 | 0 | 345.6 | 84 |
| 25'/170° C. | 45–60 | 180 | 110 | 6.8–7.7 | 0 | 576 | 84 |
| 25'/160° C. | 50 | 171 | 111 | 5.1–5.9 | 0 | 230.4 | 82 |
| 30'/160° C. | 50–65 | 181 | 100 | 6.3–6.8 | 0 | 460.8 | 86 |

KEY to Table (same as for the preceding Example).

Pigmented Powder Enamel—Example No. 5
(Comparison Example)

A powder enamel with the following formulation was produced, applied, and baked between 160° and 200° C., according to the above described general method:

525.1 parts by wt. of the polyester of Example B 1;

134.9 parts by wt. of the crosslinking agent of Example A 4;

480.0 parts by wt. of white pigment ($TiO_2$); and 60.0 parts by wt. master batch vehicle.

When the test film thickness exceeded 40 micron, it was not possible to produce a defect-free coating surface. Strong foaming occurred.

Pigmented Powder Enamel—Example No. 6

(Comparison Example)

A powder enamel with the following formulation was produced, applied, and baked between 160° and 200° C., according to the above described general method:

519.0 parts by wt. of the polyester of Example B 2;

141.0 parts by wt. of the crosslinking agent of Example A 5;

480.0 parts by wt. white pigment ($TiO_2$); and 60.0 parts by wt. master batch vehicle.

When the coating film thickness exceeded 40 micron, the foaming was so great that no characteristic coating data could be determined.

Having now fully described this invention, it will be apparent to one of ordinary skill in the art that many changes and modifications can be made thereto without departing from the spirit or scope of the invention as set forth herein.

What is claimed as new and is intended to be secured by Letters Patent is:

1. A storage-stable polyurethane resin powder enamel which cures below 170° C. which comprises:

a polyol in combination with isophorone diisocyanate (IPDI) which is blocked with a secondary amine having a boiling point of at least 150° C. selected from the group consisting of t-butyl-1-methylpentylamine, t-butyl-benzylamine, di-(1-methylpentyl)amine, di-(1-ethylbutyl)amine, dicyclohexylamine, t-butyl-cyclohexylamine, di-(3,5,5-trimethylcyclohexyl) amine, dicyclopentylamine, 2,6-dimethylpiperidine and 3,5-dimethylmorpholine.

2. The polyurethane resin powder enamel of claim 1, wherein the amount of said secondary amine reacted with said isophorone diisocyanate ranges from 0.5–1 mole per equivalent of NCO groups in said IPDI.

3. The polyurethane resin powder enamel of claim 1, wherein said blocked IPDI has a molecular weight ranging from 300–900.

4. The polyurethane resin powder enamel of claim 1, wherein from 8–20 wt. % of the NCO groups in said IPDI are blocked with said secondary amine.

5. The polyurethane resin powder enamel of claim 6, wherein the amount of blocked NCO groups ranges from 10–16 wt. %.

6. The polyurethane resin powder enamel of claim 1, wherein said polyol is a polyesterpolyol which has a molecular weight ranging from 1000 to 10,000.

* * * * *